June 2, 1942.   J. E. WILKEY   2,284,785
FRICTIONAL MATERIAL AND METHOD OF MAKING SAME
Filed April 10, 1939

INVENTOR.
JOHN E. WILKEY
BY Horace B. Fay
ATTORNEY.

Patented June 2, 1942

2,284,785

UNITED STATES PATENT OFFICE 2,284,785

FRICTIONAL MATERIAL AND METHOD OF MAKING SAME n E. Wilkey, South Euclid, Ohio, assignor to The Cleveland Graphite Bronze Company, Cleveland, Ohio, a corporation of Ohio Application April 10, 1939, Serial No. 267,153

13 Claims. (Cl. 106—36)

The present invention, relating as indicated to a friction material, is more particularly directed to a new and improved element having frictional characteristics which may be used for such purposes as clutch plates, facings for clutch plates, brake elements, facings for brake elements or for similar purposes where it is desirable to have an element of considerable strength, relatively low cost and closely controlled coefficient of friction, and possessing the property of reconditioning the surface thereof following severe service or wear.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

For clearness and convenience of description I shall describe my invention and its particular adaptation to a simple driven plate (usually called the "drive" plate) used in the conventional form of clutch now in general use in motor driven vehicles and it will be understood that although I select this illustration there are numerous other uses and applications for my improved composition.

In the field of automotive clutches a very common construction has involved the use of two spaced driving members movable toward each other to engage therebetween a single driven member which is perhaps the simplest form of clutch in common use. The frictional material employed in the common clutch consists of molded asbestos parts secured to the intermediate or driven member. Metallic facings or metal containing facings have been employed as a substitute for the usual asbestos facings, and certain types of metallic compositions have been found quite satisfactory, but present methods of manufacture and relatively high cost have so far prevented them from becoming generally accepted. The present invention is directed to a metal facing of relatively low cost which can be satisfactorily substituted for molded asbestos with improved results, both as to performance of the clutch and the life of the same.

Figure 1:
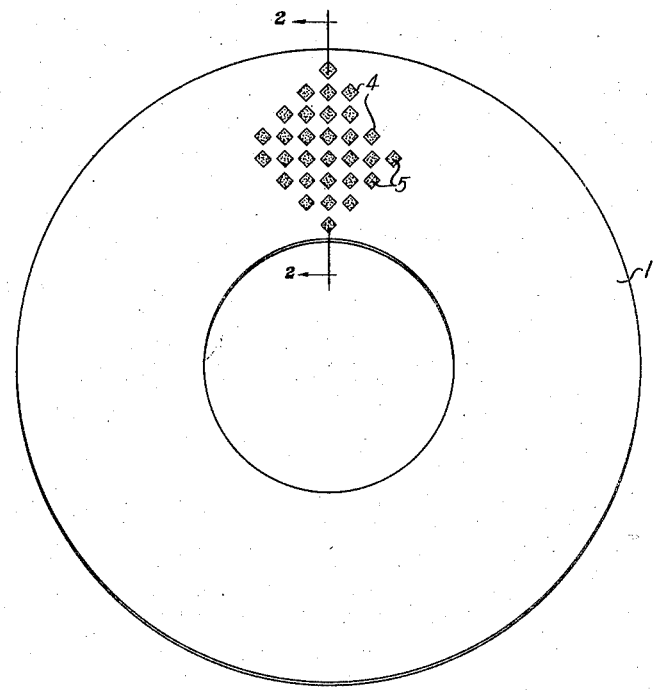
Fig. 1 is a view in perspective illustrating one form in which my invention may be used.
Figure 2:
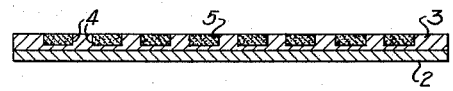
Fig. 2 is a section on the line 2—2, Fig. 1.
Figure 3:
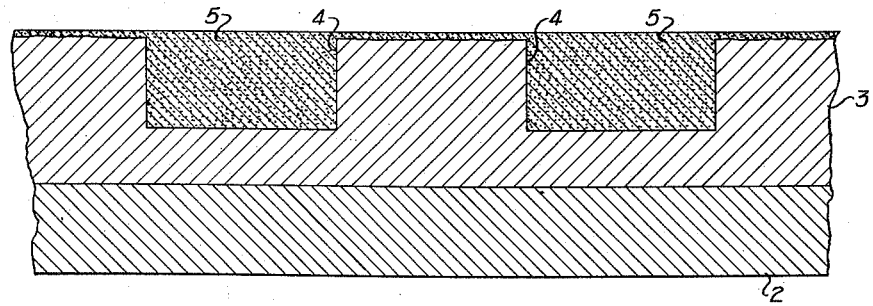
Fig. 3 is a section of my improved frictional element on a greatly enlarged scale.

Referring now to Fig. 1, there is shown a body in the form of a simple clutch plate 1 consisting, as shown in Figs. 2 and 3, of a supporting member or strip 2 of a material such as steel and a facing material 3 integrally bonded to the strip 2 and consisting of a material such as copper, bronze, lead bronze, or a bearing alloy or the like. Formed in the external face of the strip 3 are a plurality of regularly arranged indentations or recesses 4 which I fill with a conditioning composition, the purpose of which will presently be described. The plate 1 engages against another metallic plate in the ordinary clutch construction and is frictionally engaged thereby when pressure is applied to maintain the two plates in face to face engagement. During the operation of engaging one plate with another, a certain amount of slippage must occur and it is during this interval that wear and heat occur in clutch plates. When metal to metal surfaces are so engaged uneven wear, scoring and pickup of one metal on the other occur, due either to irregularities in the surface of the plates or the irregularities in the hardness of the metal in the surfaces, so that for most purposes it is impractical to use a true metal to metal contact. It will be understood that wherever I have used the term "clutch" in the present description, I intend this term to include analogous articles, such as brakes, in which the present invention is also highly useful.

I have devised a conditioning agent or material 5 which may be filled into the pockets 4 and which serves, as it is gradually drawn out of these pockets by the action of the opposing plate or glaze over the surface of the plate 1, filling any tiny crevices, scratching or depressions therein and producing a coating all over the surface of the plate which is of minute thickness, but which serves to increase, or in some cases, decrease, the friction of the plate, prevent scoring of the same and, if scoring does occur, to recondition the surface and fill up the scratches caused by wear.

A material which I have found very satisfactory for the purpose consists of molybdenum sulphide, 50 to 80 parts, finely divided graphite, 10 to 20 parts, and about 25 parts of a binder, the nature of which will be presently described. This mixture is made into a pasty mass, which is then filled into the pockets until flush with the outer surface of the plate, where it is heated and allowed to harden or set. It possesses sufficient adhesiveness to be retained in the pockets, although the latter may be given converging walls to assist in mechanically retaining the material therein if desired. Any of the commercial qualities of molybdenum sulphide have been found satisfactory and many types of graphite, such as electric furnace graphite or micronized natural graphite, may be used. Any suitable drying oil may be employed for the binder.

This material when employed in the manner indicated aids in producing, after slight use, a uniform glaze over the surface of the plate which is of a thickness of the nature of $1/10000$ of an inch. This glaze, when cut through or worn out, is resupplied with the material in the pockets which is drawn or flowed out of the pockets over the surface of the plate and acts to fill up any minute irregularities therein and to produce a continuous uniform glaze or coating thereover.

In the preparation of the composition, the materials named are first intimately mixed and then applied to the plate by filling the recesses in the plate with the material, as illustrated in Fig. 2. The plate is then heated in a controlled neutral or reducing atmosphere from 30 to 60 minutes at 200° F., for an equal period at approximately 450° F. and finally for another equal period at between 650° and 750° F. During the heating it is desirable that a neutral atmosphere be maintained surrounding the material in order to prevent decomposition of the molybdenum sulphide. Moreover, it is important, in order to obtain the proper adhesion and to properly condition the material, to adhere fairly closely to the heating temperatures set forth above.

Various compositions may be employed as well as that named, but a very satisfactory composition consists of:

| | Parts |
|---|---|
| Molybdenum sulphide | 69 |
| Graphite | 14.1 |
| Binder | 25 |

Another suitable composition consists of

| | Parts |
|---|---|
| Molybdenum sulphide | 69 |
| Graphite | 10 |
| Silica | 10 |
| Feldspar | 10 |

A satisfactory binder for use in the above compositions consists of

| | Per cent |
|---|---|
| Boiled linseed oil | 32 |
| Rosin | 67 |
| Mineral oil | *1 |

*Including about 5% of metal organic esters.

Various other binders may be used, such for example as natural rosin mixed with tung oil, phenol, formaldehyde resins, dissolved in a suitable solvent, and various others.

An examination of the glaze produced on the clutch plate from the compositions described above shows that it consists of highly polymerized hydrocarbons which represent the binder, graphite, and molybdenum and sulphur in the proportions of molybdenum sulphide. Various tests with this improved plate have shown very satisfactory operation, easy engagement, a low rate of wear and comparatively long life, with a coefficient of friction which is sufficiently high so that the total area or size of the clutch plate need not be increased over that now used to handle the same engine torque.

The molybdenum sulphide contributes unique properties to the material, among which may be enumerated the following:

1. Molybdenum sulphide is most nearly like graphite in its properties, but is stronger than graphite and, therefore, does not wear as greatly under pressure.

2. Molybdenum sulphide has the ability to keep the friction surfaces smoother than materials not containing it.

3. Molybdenum sulphide causes a smoother operation of two friction mating members than when it is not used, that is, it has a tendency to load a surface and change its characteristics.

4. Molybdenum sulphide has the property of healing the surface of friction members when a slivering, a pickup, or other conditions occur on the surface, that is to say it has the property of filling or refilling crevices in a surface.

I am aware of the suggestion made in Patent No. 1,714,564 of the use of talc, mica, graphite or molybdenum sulphide as a lubricating element in a mixture formed of a metal powder, but no disclosure is here made of the distinctive properties of the sulphide which set it apart from the other materials named, nor is there any suggestion in the above named patent of the critical range as to amount of the sulphide which gives the results described herein. Diligent search and exhaustive experiments among various elements and compounds have shown that molybdenum sulphide has properties which make it unique for the purposes for which it is here used.

Other modes of applying the principle of my invention may be employed instead of the one explained, change being made as regards the compositions and methods herein disclosed, provided the means stated by any of the following claims or the equivalent of such stated means be employed.

I therefore particularly point out and distinctly claim as my invention:

1. A composition of the character described comprising a mixture of approximately fifty to eighty parts of molybdenum sulphide, ten to twenty parts of graphite and about twenty-five parts of a binder.

2. A conditioning agent of the character described comprising substantially 69 parts of molybdenum sulphide, 14 parts of graphite and 25 parts of a binder, treated at a temperature sufficient to solidify the mixture.

3. A conditioning agent of the character described comprising a mixture of substantially 69 parts of molybdenum sulphide, 10 parts each of graphite, silica and feldspar, and 25 parts of a binder, treated at a temperature sufficient to solidify the mixture.

4. A conditioning agent of the character described comprising substantially 69 parts of molybdenum sulphide, 14 parts of graphite and 25 parts of a binder consisting of 32% boiled linseed oil, 67% rosin and 1% mineral oil.

5. A conditioning agent of the class described comprising a mixture of substantially 69 parts of molybdenum sulphide, 10 parts each of graphite, silica and feldspar, and 25 parts of a binder consisting of 32% boiled linseed oil, 67% rosin and 1% mineral oil.

6. In a method of making a conditioning agent of the character described, the steps which consist in mixing finely divided molybdenum sulphide, graphite and a binder, and then heating the same progressively up to a temperature between 650° F. and 750° F.

7. In a method of making a conditioning agent of the character described, the steps which consist in mixing together substantially 69 parts of molybdenum sulphide, 14 parts of graphite and 25 parts of a binder, heating the mixture for between 30 to 60 minutes at a temperature of 200° F., then heating the mixture at a temperature of approximately 450° F. for an equal period, and then heating the mixture at a temperature of from between 650° F. and 750° F. for an equal period.

8. A conditioning agent of the character described, comprising a mixture of molybdenum sulphide in a predominant amount and graphite in a minor amount.

9. A conditioning agent of the character described, comprising a mixture of molybdenum sulphide in a predominant amount, graphite in a minor amount and a binder.

10. A conditioning agent of the character described, comprising a mixture of molybdenum sulphide in a predominant amount, graphite in a minor amount and an organic binder.

11. A conditioning agent of the character described comprising a mixture of molybdenum sulphide in a predominant amount, and graphite, silica and feldspar in minor amounts.

12. A conditioning agent of the character described, comprising a mixture of molybdenum sulphide in a predominant amount, graphite, silica and feldspar in minor amounts, and a binder.

13. A conditioning agent of the character described, comprising a mixture of molybdenum sulphide in a predominant amount, graphite, silica and feldspar in minor amounts, and an organic binder.

JOHN E. WILKEY.